(12) United States Patent
Griffith et al.

(10) Patent No.: US 6,358,642 B1
(45) Date of Patent: Mar. 19, 2002

(54) FLOW CHANNELS FOR FUEL CELL

(75) Inventors: Kim R. Griffith; Jeffrey Allan Rock, both of Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/453,088

(22) Filed: Dec. 2, 1999

(51) Int. Cl.⁷ .............................................. H01M 2/00
(52) U.S. Cl. .......................... 429/34; 429/12; 429/13; 429/38; 429/39
(58) Field of Search ........................... 429/12, 13, 34, 429/38, 39

(56) References Cited

U.S. PATENT DOCUMENTS

| | | | |
|---|---|---|---|
| 4,686,159 A | 8/1987 | Miyoshi | 429/39 |
| 5,108,849 A | 4/1992 | Watkins et al. | 429/30 |
| 5,300,370 A | 4/1994 | Washington et al. | 429/34 |
| 5,773,160 A * | 6/1998 | Wilkinson et al. | 429/13 |
| 5,776,624 A | 7/1998 | Neutzler | 429/26 |
| 6,099,984 A * | 8/2000 | Rock | 429/39 |
| 6,117,577 A * | 9/2000 | Wilson | 429/17 |

FOREIGN PATENT DOCUMENTS

WO    WO96/12316    4/1996

* cited by examiner

*Primary Examiner*—Carol Chaney
*Assistant Examiner*—Dah-Wei D. Yuan
(74) *Attorney, Agent, or Firm*—Lawrence B. Plant; Cary W. Brooks

(57) ABSTRACT

A PEM fuel cell having serpentine flow field channels wherein each channel has an inlet leg, an exit leg, at least one medial leg therebetween and hairpin curves connecting the legs to each other. The legs all extend in the same general direction between a gas supply and gas exhaust manifold. One of the inlet and exit legs is longer than the other while the medial leg is shorter than the shortest of the inlet/exit leg. The land(s) defining the medial leg(s) of adjacent channels are generally aligned lengthwise.

10 Claims, 5 Drawing Sheets

FLOW CHANNELS FOR FUEL CELL

TECHNICAL FIELD

This invention relates to PEM fuel cells and more particularly to the reactant flow fields therefor.

BACKGROUND OF THE INVENTION

Fuel cells have been proposed as a power source for many applications. One such fuel cell is the PEM (i.e., proton exchange membrane) fuel cell. PEM fuel cells are well known in the art and include in each cell thereof a so-called "membrane-electrode-assembly" (hereafter MEA) comprising a thin (i.e., ca. 0.0015–0.007 inch), proton-conductive, polymeric, membrane-electrolyte having an anode electrode film (i.e., ca. 0.002 inch) formed on one face thereof, and a cathode electrode film (i.e., ca. 0.002 inch) formed on the opposite face thereof. Such membrane-electrolytes are well known in the art and are described in such U.S. Pat. Nos. 5,272,017 and 3,134,697, as well as in the Journal of Power Sources, Volume 29 (1990) pages 367–387, inter alia. In general, such membrane-electrolytes are made from ion-exchange resins, and typically comprise a perfluoronated sulfonic acid polymer such as NAFION™ available from the E.I. DuPont de Nemours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas permeable, conductive material, known as a "diffusion layer", which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, through which the gas can move to contact the MEA underlying the lands, as is well known in the art.

The thusly formed sandwich is pressed between a pair of electrically conductive plates which serve as secondary current collectors for collecting the current from the primary current collectors and conducting current between adjacent cells (i.e., in the case of bipolar plates) internally of the stack, and externally of the stack in the case of monopolar plates at the ends of the stack. The secondary current collecting plates each contain at least one so-called "flow field" that distributes the fuel cell's gaseous reactants (e.g., $H_2$ and $O_2$/air) over the surfaces of the anode and cathode. The flow field includes a plurality of lands which engage the primary current collector and define therebetween a plurality of flow channels through which the gaseous reactants flow between a supply manifold at one end of the channel and an exhaust manifold at the other end of the channel. Serpentine flow channels are known and connect the supply and exhaust manifolds only after having made a number of hairpin turns and switch backs such that each leg of the serpentine flow channel borders at least one other leg of the same serpentine flow channel (see U.S. Pat. No. 5,108,849). Serpentine channels are advantageous in that they permit some gas flow between adjacent legs of the same channel; via the diffusion layer. In this regard, gas can flow from an upstream portion of the channel to a downstream portion of the channel where gas pressure is lower (i.e. due to the pressure drop down the length of the channel), by flowing through the diffusion layer over the land that separates the upstream leg from the downstream leg portion of the flow channel.

The pressure drop between the supply manifold and the exhaust manifold is of considerable importance in designing a fuel cell. One of the ways of providing a desirable pressure drop is to vary the length of the flow channels extending between the supply and exhaust manifolds. Serpentine channels used heretofore (e.g., see U.S. Pat. No. 5,776,624) limit design flexibility in that such channels require an odd number of legs (e.g. 3,5,7 etc) that extend most of the distance between the manifolds. Hence the length of each channel is in large part determined by the distance between the manifolds.

SUMMARY OF THE INVENTION

The present invention overcomes the aforesaid problem by providing serpentine flow channels whose length can be varied, essentially at will, without regard for the distance between the manifolds and without having any unused space in the flow field. More specifically, the present invention is an improvement to PEM fuel cells of the type discussed above which comprises: a proton exchange membrane having opposing cathode and anode faces on opposite sides thereof; a gas-permeable, electrically conductive cathode current collector engaging the cathode face; a gas permeable electrically conductive anode current collector engaging the anode face; and a current-collecting plate engaging at least one of the gas-permeable collectors and defining a gas flow field that confronts that gas-permeable collector. The flow field comprises a plurality of lands that engage the current collector and define a plurality of substantially equal-length serpentine gas flow channels, each of which has: an inlet leg for receiving gas from a supply manifold that is common to all of the flow channels; an exit leg for discharging said gas into an exhaust manifold that is common to all of the flow channels; and at least one medial leg that lies intermediate the inlet and exit legs. The inlet, exit and medial legs for each channel border at least one other leg of the same channel. In accordance with the present invention: one of the inlet and exit legs of each channel extends for a first length from its associated supply or exhaust manifold in the direction of the other manifold; the other of the inlet and exit legs extends in the same general direction as the one inlet and exit leg for a second length that is less than said first length; the medial leg extends in the same general direction as the inlet and exit legs for a third length that is less than the second length and is defined by a land which is spaced from, and substantially aligned lengthwise with, a similarly situated medial leg of an adjacent flow channel; and a hairpin curve in the channel at each end of the medial leg connects the medial leg to adjacent legs of the same channel. Each serpentine channel may include one or more medial legs to vary its length. In one embodiment of the invention, the length of the medial leg is less than about one half that of the longest of the inlet and exit legs. In another embodiment, the medial leg is less than about one third the length of the longest of the inlet and exit legs. In still another embodiment, the medial leg is less than about one quarter the length of the longest of the inlet and exit legs. In accordance with another embodiment yet, the supply and exhaust manifolds lie at opposite ends of the flow field and one of the inlet and exit legs extends for nearly the entire length of the flow field between the manifolds. Preferably, the inlet legs of adjacent channels border each other and the exit legs of adjacent channels border each other, but the inlet legs do not border the exit legs for the same reasons as set forth in copending U.S. patent application Ser. No. 09/016,127 filed Jan. 30, 1998 in name of Jeffrey Rock, and assigned to the assignee of the present application.

BRIEF DESCRIPTION OF THE DRAWINGS

The invention will be better understood when considered in the light of the following detailed description of a specific embodiment thereof which is given hereafter in conjunction with the several figures in which.

DESCRIPTION OF THE PREFERRED EMBODIMENT

Figure 1:
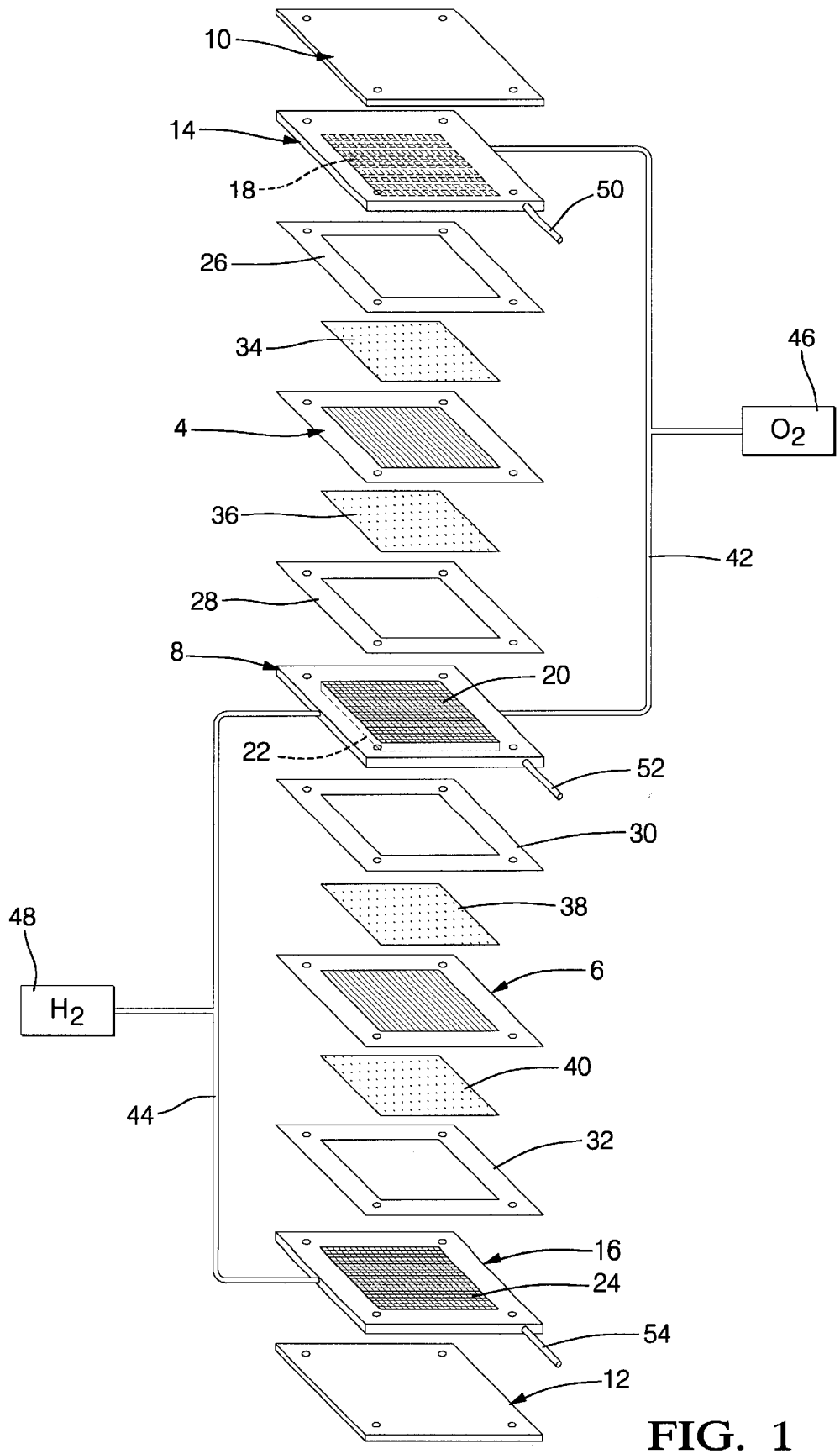
FIG. 1 is a schematic, isometric, exploded illustration of a PEM fuel cell.

FIG. 1 depicts a two cell, bipolar, PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end contact plates 14 and 16. The monopolar end contact plates 14 and 16, as well as the bipolar plate 8, each contain flow fields 18, 20, 22 and 24 comprising a plurality of channels formed in the faces of the plates for distributing fuel and oxidant gases (i.e., $H_2$ & $O_2$) to the anode and cathode faces of the MEAs 4 and 6. Nonconductive gaskets 26, 28, 30, and 32 provide seals and electrical insulation between the several plates of the fuel cell stack. Porous, gas permeable, electrically conductive sheets 34, 36, 38 and 40 press up against the electrode faces of the MEAs 4 and 6 and serve as primary current collectors for the electrodes as well as mechanical supports for the MEAs, especially at locations where the MEAs 4 and 6 span flow channels in the flow field and are otherwise unsupported. Suitable primary current collectors include carbon/graphite paper/cloth, fine mesh noble metal screens, open cell noble metal foams, and the like which conduct current from the electrodes while allowing gas to pass therethrough to reset on the electrodes. The end contact elements 14 and 16 press up against the primary current collectors 34 and 40 respectively, while the bipolar plate 8 presses up against the primary current collector 36 on the anode face of MEA 4, and against the primary current collector 38 on the cathode face of MEA 6. Oxygen is supplied to the cathode side of the fuel cell stack from a storage tank 46 via appropriate supply plumbing 42, while hydrogen is supplied to the anode side of the fuel cell from a storage tank 48, via appropriate supply plumbing 44. Preferably, the $O_2$ tank 46 is eliminated and air is supplied to the cathode side from the ambient. Preferably the $H_2$ tank 48 is eliminated and hydrogen supplied to the anode from a reformer which catalytically generates hydrogen from methanol or a liquid hydrocarbon (e.g., gasoline). Exhaust plumbing (not shown) for both the $H_2$ and $O_2$/air sides of the MEAs is also be provided for removing $H_2$-depleted anode gas from the anode flow field and $O_2$-depleted cathode gas from the cathode flow field. Additional plumbing 50, 52 and 54 is provided for supplying liquid coolant to the bipolar plate 8 and end plates 14 and 16, as may be needed. Appropriate plumbing for exhausting coolant from the plate 8 and end plates 14 and 16 is also provided, but not shown.

Figure 2:
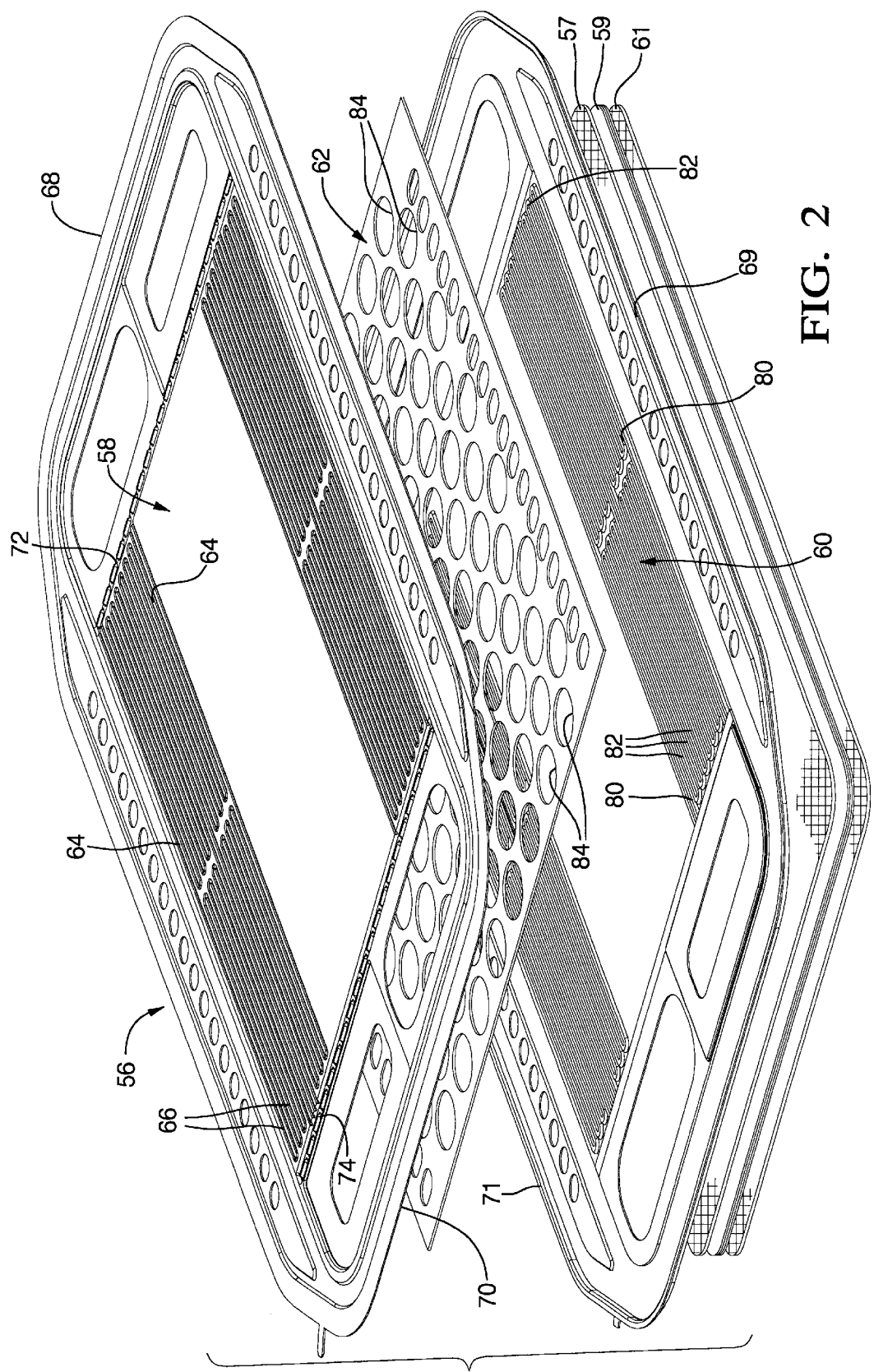
FIG. 2 is an isometric, exploded view of an MEA and bipolar plate in a fuel cell stack.

FIG. 2 is an isometric, exploded view of a bipolar plate 56, first primary porous current collector 57, MEA 59 and second primary porous current collector 61 as they are stacked together in a fuel cell. A second bipolar plate (not shown) would underlie the second primary current collector 61 to form one complete cell. Similarly, another set of primary current collectors and MEA (not shown) will overlie the upper sheet 58. The bipolar plate 56 comprises a first exterior metal sheet 58, a second exterior metal sheet 60, and an interior spacer metal sheet 62 which is brazed interjacent the first metal sheet 58 and the second metal sheet 60. The metal sheets 58, 60 and 62 are made as thin as possible (e.g., about 0.002–0.02 inches thick), may be formed by stamping, by photo etching (i.e., through a photolithographic mask) or any other conventional process for shaping sheet metal. The external sheet 58 is formed so as to provide a reactant gas flow field characterized by a plurality of lands 64 which define therebetween a plurality of serpentine gas flow channels 66 through which the fuel cell's reactant gases (i.e., $H_2$ or $O_2$) flow in a tortuous path from near one edge 68 of the bipolar plate to near the opposite edge 70 thereof. When the fuel cell is fully assembled, the lands 64 would press against the primary current collectors 61 which, in turn, press against the MEA 59. In operation, current flows from the primary current collector through the lands 64 and thence through the stack. The reactant gas is supplied to channels 66 from a header or supply manifold groove 72 that lies adjacent the edge 68 of the plate 56 at one end of the flow field, and exits the channels 66 via an exhaust manifold groove 74 that lies adjacent the opposite edge 70 of the fuel cell at the other end of the flow field. The underside of the metal sheet 58 includes a plurality of ridges (not shown) which define therebetween a plurality of grooves (not shown) through which coolant passes during the operation of the fuel cell.

Metal sheet 60 is similar to sheet 58. The internal (i.e., coolant side) of sheet 60 is shown in FIG. 2. In this regard, there is depicted the backside of the flow field characterized by a plurality of ridges 80 defining therebetween a plurality of grooves 82 through which coolant flows from one edge 69 of the bipolar plate to the opposite edge 71. Like sheet 58, the external side of the sheet 60 will have a plurality of lands (not shown) thereon defining a plurality of channels (not shown) through which the reactant gases pass. An interior metal spacer sheet 62 is interjacent the exterior sheets 58 and 60 and includes a plurality of apertures 84 therein to permit coolant to flow between the grooves 82 in sheet 60 and the grooves on the underside of sheet 58 thereby breaking laminar boundary layers and affording turbulence, and hence more effective heat exchange with the inside faces of the exterior sheets 58 and 60 respectively. The several sheets 58, 60 and 62 are preferably brazed together.

Figure 3:
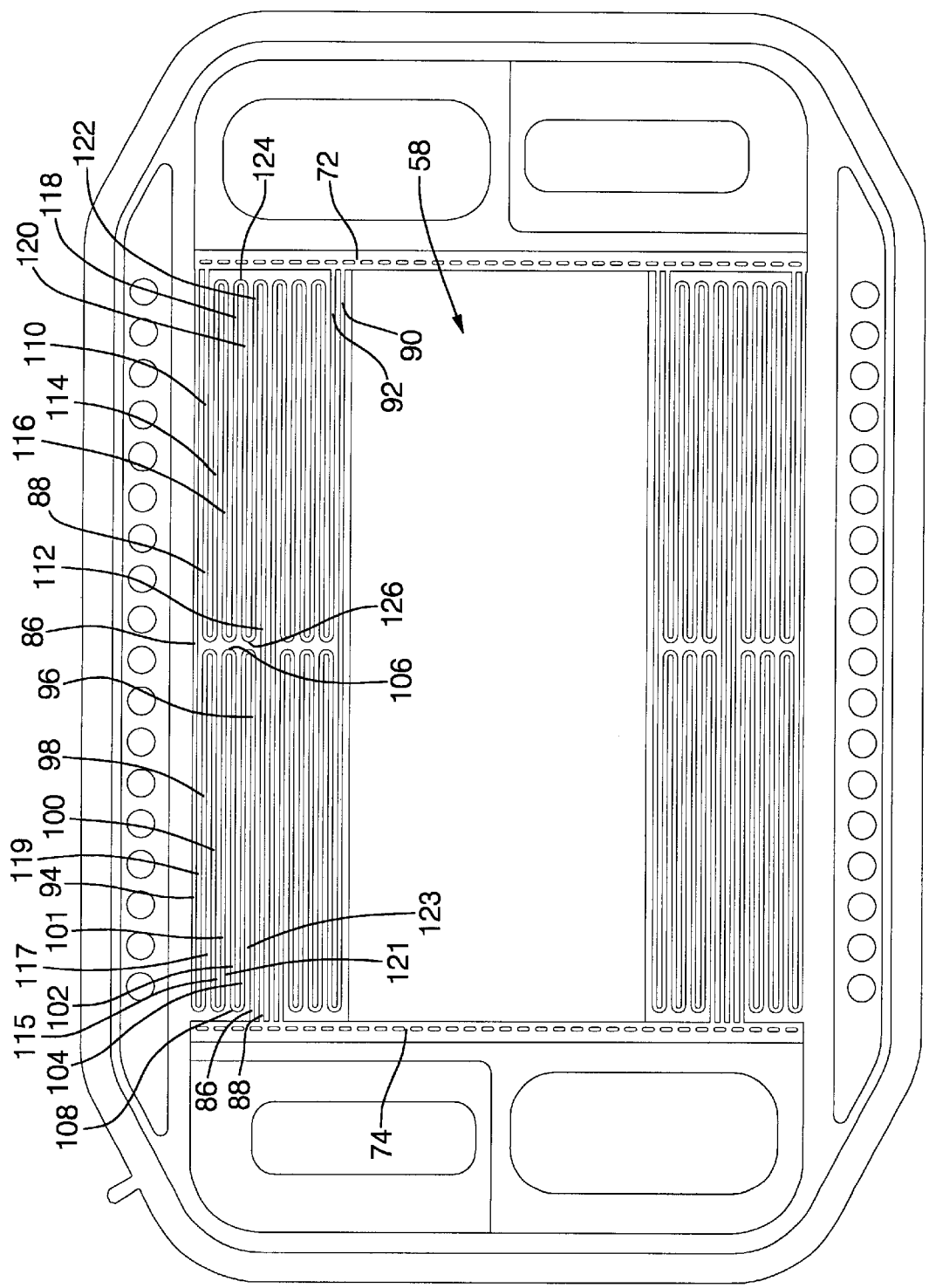
FIG. 3 is a plan view of the flow field face of the bipolar plate of FIG. 2.

FIG. 3 is an enlarged view of the plate 58 and shows a plurality of flow channels 86, 88, 90 and 92. While channels have been illustrated at both sides of the flow field for simplicity sake, it is to be understood that the entire flow field (including the center blank portion) would be filled with gas flow channels in accordance with the present invention. Flow channel 86 has an inlet leg 94 opening into the supply manifold 72, an exit leg 96 opening into the exhaust manifold 74 and a plurality of medial legs 98, 100, 101,102 and 104 intermediate, and extending in the same general direction as, the inlet and exit legs 94 and 96 respectively. The medial legs 98,100,101,102,104 of each flow channel are each joined to adjacent legs (i.e. medial, inlet or exit) of the same channel by hairpin curves (e.g. 106 and 108 inter alia) therein.

Flow channel 88 lies adjacent flow channel 86 and has a inlet leg 110 opening into supply manifold 72, an exit leg 112 opening into the exhaust manifold 74 and a plurality of medial legs 114,116,118,120,122. The medial legs 114,116, 118,120,122 of this flow channel are joined to adjacent legs of the same channel by hair pin curves (e.g. 124 and 126 inter alia) therein. The serpentine portion that is formed by the medial leg(s) of one channel (e.g. 86) is aligned lengthwise with the serpentine portion of the channels formed by the medial legs of adjacent channel (e.g. 88). In this embodiment, the inlet leg 94 of channel 86 is quite long and extends almost the entire distance between the supply manifold 72 and exhaust manifold 74, whereas the exit leg of channel 86 is only about half that length. On the other hand, inlet leg 110 of the channel 88 is only about one half the length of the exit leg 112 of channel 88. The medial legs 98,100,101,102,104 of channel 86 are slightly shorter than the exit leg 96. For channel 88, the opposite is true with the inlet leg 110, coupled to the supply manifold 72 being the shorter leg and the exit leg 112 being the longer leg. The length of each channel can be varied by changing the length and number of the medial legs in each channel. The lands 115,117,119,121 and 123 defining the medial legs 98,100, 101,102 and 104 are generally aligned lengthwise. By "generally aligned" is meant not necessarily perfectly aligned, but sufficiently aligned that the serpentine portions of adjacent channels are aligned in a row extending between the supply and exhaust manifolds.

Figure 4:
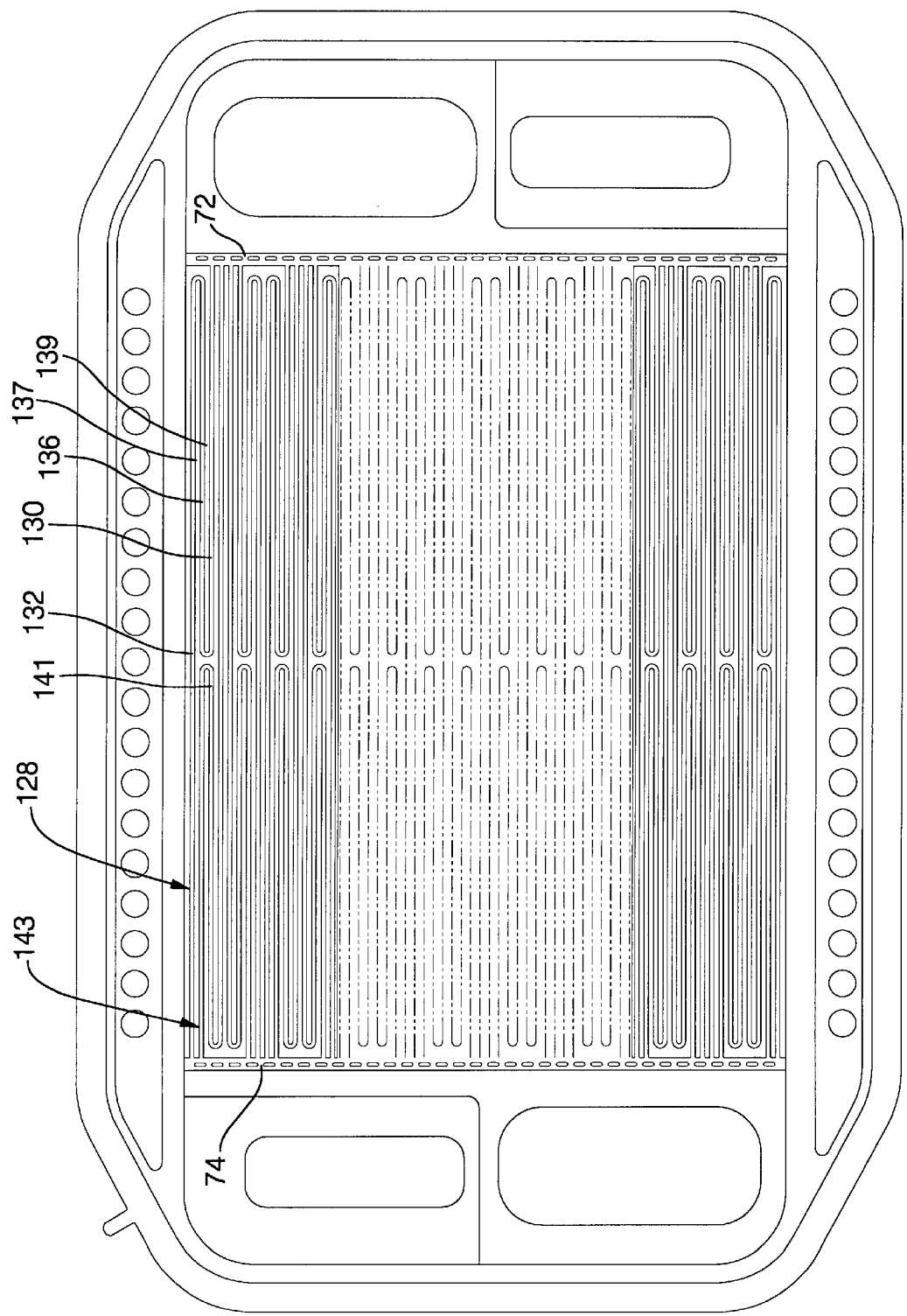
FIG. 4 is a view like that of FIG. 3 showing an alternative embodiment of the present invention.

The embodiment shown in FIG. 4 is similar to that shown in FIG. 3 except that whereas the FIG. 3 embodiment had five (5) medial legs between the inlet and exit legs, the FIG. 4 embodiment has only one. In this regard, FIG. 4 shows a flow channel 128 having an inlet leg 130 opening to supply manifold 72, a longer exit leg 132 opening into exhaust manifold 74 and a single medial leg 136 between the inlet and exit legs. Inlet leg 130 is about half the length of the exit leg 132. The lands 137 and 139 defining the medial leg 136 and are generally aligned lengthwise with the lands defining the medial leg 141 of the next adjacent flow channel 143.

Figure 5:
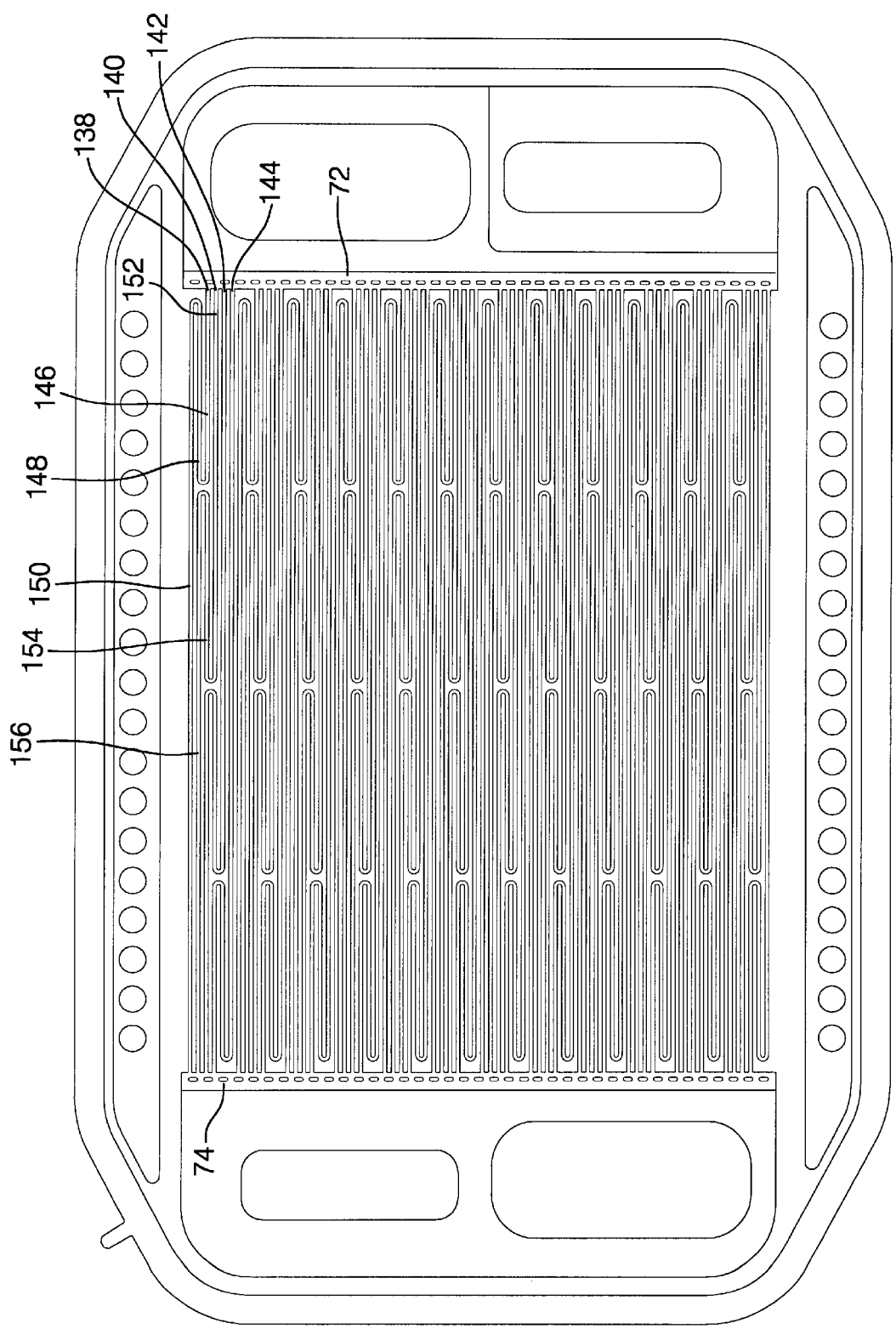
FIG. 5 is a view like that of FIG. 3 showing still another embodiment of the present invention.

The embodiment shown in FIG. 5 is similar to that shown in FIG. 3 except that the medial legs are approximately one third the length of the longest inlet or exit leg and one half the length of the shortest inlet or exit legs. In this regard, FIG. 5 shows adjacent flow channels 138, 140, 142, 144. Channel 138 has an inlet leg 146 opening into supply manifold 72, a medial leg 148 and exit leg 150 opening into exhaust manifold 74. Likewise, channel 140 has an inlet leg 152, a medial leg 154 and exit leg 156 opening into exhaust manifold 74. Channels 142 and 144 are similarly configured but with different length inlet and exit legs to shift the location of their respective medial legs without changing the overall length of each channel.

While not shown, designs having longer and shorter medial legs are possible. Hence, for example, the medial leg could have a length equal to about one third the length of the longest leg of the channel, or for that matter, lengths less than the one quarter length shown in FIG. 5.

While the invention has been disclosed in terms on one specific embodiment thereof, it is not intended that it be limited thereto but rather only to the extent set forth hereafter in the claims which follow.

What is claimed is:

1. In a PEM fuel cell comprising (1) a proton exchange membrane having opposing cathode and anode faces on opposite sides of said membrane, (2) a gas permeable electrically conductive cathode current collector engaging said cathode face, (3) a gas permeable electrically conductive anode current collector engaging said anode face, and (4) a current-collecting plate engaging at least one of said gas permeable cathode and anode current collectors and defining a gas flow field confronting said one gas permeable collector, said flow field comprising a plurality of lands engaging said one current collector and defining a plurality of substantially equal-length serpentine gas flow channels, each of said channels having (a) an inlet leg for receiving gas from a supply manifold that is common to all said flow channels, (b) an exit leg for discharging said gas into an exhaust manifold that is common to all said flow channels, and (c) at least one medial leg intermediate said inlet and exit legs, said inlet, exit and medial legs for each channel at least in part bordering at least one other leg of the same channel, the improvement wherein (1) one of said inlet and exit legs extends for a first length from its associated supply or exhaust manifold in the direction of the other manifold, (2) the other of said inlet and exit legs extends in the same general direction as said one said inlet and exit leg for a second length that is less than said first length, (3) said medial leg extends in the same general direction as said inlet and exit legs for a third length that is less than said second length and is defined by a said land which is spaced from, and generally aligned lengthwise with, a land defining a medial leg of an adjacent flow channel, and (4) a hairpin curve at each end of said medial leg connecting said medial leg to adjacent legs of the same channel.

2. The PEM fuel cell according to claim 1 wherein said third length is less than about one half said first length.

3. The PEM fuel cell according to claim 1 wherein said channel includes a plurality of said medial legs intermediate said inlet and exit legs.

4. The PEM fuel cell according to claim 1 wherein said third length is less than about one third said first length.

5. The PEM fuel cell according to claim 1 wherein said third length is less than about one quarter said first length.

6. The PEM fuel cell according to claim 1 wherein the inlet legs of adjacent channels border each other but not the exit legs, and the exit legs of adjacent channels border each other but not the inlet legs.

7. In a PEM fuel cell comprising (1) a proton exchange membrane having opposing cathode and anode faces on opposite sides of said membrane, (2) a gas permeable electrically conductive cathode current collector engaging said cathode face, (3) a gas permeable electrically conductive anode current collector engaging said anode face, and (4) a current-collecting plate engaging at least one of said gas permeable cathode and anode current collectors and defining a gas flow field confronting said one gas permeable collector, said flow field comprising a plurality of lands engaging said one current collector and defining a plurality of substantially equal-length serpentine gas flow channels, each of said channels having (a) an inlet leg for receiving gas from a supply manifold that is common to all said flow channels and lies adjacent a first end of said flow field, (b) an exit leg for discharging said gas into an exhaust manifold that is common to all said flow channels and lies adjacent a second end of said flow field opposite said first end, and (c) at least one medial leg intermediate said inlet and exit legs, said inlet, exit and medial legs for each channel bordering at least one other leg of the same channel, the improvement wherein (1) one of said inlet and exit legs extends for a first length equal to nearly the entire length of said flow field between said edges, (2) the other of said inlet and exit legs extends in the same general direction as said one said inlet and exit leg for a second length that is less than about half said first length, (3) said medial leg extends in the same general direction as said inlet and exit legs for a third length that is less than said second length and is defined by a said land which is spaced from, and generally aligned lengthwise with, a land defining a medial leg of an adjacent flow channel, and (4) a hairpin curve at each end of said medial leg connecting said medial leg to adjacent legs of the same channel.

8. The PEM fuel cell according to claim 7 wherein said channel includes a plurality of said medial legs intermediate said inlet and exit legs.

9. The PEM fuel cell according to claim 7 wherein said third length is less than about one third said first length.

10. The PEM fuel cell according to claim 7 wherein said third length is less than about one quarter said first length.

* * * * *